US010264587B2

(12) United States Patent
Hiben et al.

(10) Patent No.: US 10,264,587 B2
(45) Date of Patent: Apr. 16, 2019

(54) COLLABORATIVE INTERFERENCE MITIGATION BETWEEN PHYSICALLY-PROXIMATE NARROWBAND AND BROADBAND COMMUNICATION DEVICES

(75) Inventors: Bradley M. Hiben, Glen Ellen, IL (US); Henry W. Anderson, Palatine, IL (US); Jeff S. Anderson, Itasca, IL (US); Bruce D. Oberlies, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 13/351,771

(22) Filed: Jan. 17, 2012

(65) Prior Publication Data
US 2013/0183904 A1 Jul. 18, 2013

(51) Int. Cl.
H04W 36/20 (2009.01)
H04W 72/08 (2009.01)
H04W 84/18 (2009.01)

(52) U.S. Cl.
CPC ......... *H04W 72/082* (2013.01); *H04W 36/20* (2013.01); *H04W 84/18* (2013.01)

(58) Field of Classification Search
CPC ........ H04B 15/00; H04B 1/0475; H04B 1/10; H04B 1/1027; H04B 1/71; H04B 5/02;
(Continued)

(56) References Cited

U.S. PATENT DOCUMENTS 5,953,665 A * 9/1999 Mattila ............... H04W 48/16
370/329

7,016,319 B2 3/2006 Baum et al.
(Continued)

FOREIGN PATENT DOCUMENTS

EP 1 261 228 A2 11/2002
EP 1 388 951 A2 2/2004
(Continued)

OTHER PUBLICATIONS

"B26 Downlink LTE to PS co-existence," Motorola Solutions, 8.3.1, 3GPP TSG-RAN4#59AH, R4-113744, pp. 6, Jun. 27-Jul. 1, 2011.
(Continued)

*Primary Examiner* — Andrew Wendell
*Assistant Examiner* — Maryam Soltanzadeh
(74) *Attorney, Agent, or Firm* — Barbara R. Doutre

(57) ABSTRACT

A communication pathway (145) can be established between physically collocated narrowband (135) and broadband (105) devices. The narrowband device (135) can identify a communication channel. A transmission frequency used by the broadband device (105) can be spectrally-proximate to a reception frequency used by the narrowband device (135) in a frequency range associated with the communication channel, resulting in interference of the narrowband device's (135) reception when the broadband device (105) is transmitting and the narrowband device (135) is receiving concurrently. The narrowband device (135) can instruct the broadband device (105) to switch to a transmission spectrum block that is spectrally separated from the reception spectrum block of the communication channel to minimize interference between the devices when the narrowband device (135) handles a call assignment.

18 Claims, 7 Drawing Sheets

(58) Field of Classification Search
CPC .... H04B 5/0031; H04B 5/0081; H04B 10/00; H04B 13/005; H04B 1/3838; H04B 1/707; H04B 5/00; H04B 5/0006; H04B 5/0018; H04B 5/0043; H04B 5/0056; H04B 15/02; H04B 17/345; H04W 84/18; H04W 4/008; H04W 8/205; H04W 72/082; H04W 28/048; H04W 36/20; H04W 40/16; H04W 72/0453; H04M 1/7253; H04H 20/80
USPC .............................. 455/63.1, 41.1, 41.2, 41.3
See application file for complete search history.

(56) References Cited

U.S. PATENT DOCUMENTS

| | | | |
|---|---|---|---|
| 7,366,471 B1 | 4/2008 | Kitchin | |
| 7,593,691 B2 | 9/2009 | Karabinis | |
| 7,848,221 B2 | 12/2010 | Ding et al. | |
| 7,860,521 B2 | 12/2010 | Chen et al. | |
| 8,098,639 B2* | 1/2012 | McDonald | H04W 72/005 370/338 |
| 8,107,880 B2 | 1/2012 | Okker et al. | |
| 8,346,171 B1 | 1/2013 | Mack | |
| 8,437,361 B2* | 5/2013 | Guo | H04L 5/0098 370/328 |
| 8,504,090 B2* | 8/2013 | Klein | H04M 3/42178 370/280 |
| 8,520,544 B2 | 8/2013 | Aguirre et al. | |
| 8,526,410 B2 | 9/2013 | Li et al. | |
| 8,588,699 B2 | 11/2013 | Park et al. | |
| 8,594,576 B2 | 11/2013 | Palanki | |
| 8,655,304 B2 | 2/2014 | Makhlouf et al. | |
| 8,676,216 B2 | 3/2014 | Zhou et al. | |
| 8,681,660 B2 | 3/2014 | Xu et al. | |
| 8,731,568 B1* | 5/2014 | Epstein et al. | 455/448 |
| 8,830,985 B2 | 9/2014 | Xu et al. | |
| 9,008,020 B2 | 4/2015 | Yacobi et al. | |
| 2001/0016499 A1 | 8/2001 | Hamabe | |
| 2004/0203667 A1* | 10/2004 | Schroeder | H04W 48/04 455/414.1 |
| 2005/0096062 A1 | 5/2005 | Ji et al. | |
| 2006/0114864 A1 | 6/2006 | Fuccello et al. | |
| 2006/0188003 A1 | 8/2006 | Larsson | |
| 2006/0292986 A1 | 12/2006 | Bitran et al. | |
| 2007/0264940 A1 | 11/2007 | Ho et al. | |
| 2008/0019334 A1* | 1/2008 | Adams | H04W 36/20 370/338 |
| 2008/0108363 A1 | 5/2008 | Yu et al. | |
| 2008/0279130 A1 | 11/2008 | Lewis | |
| 2009/0147763 A1 | 6/2009 | Desai et al. | |
| 2009/0170542 A1 | 7/2009 | Chen et al. | |
| 2009/0196210 A1* | 8/2009 | Desai | H04W 52/0225 370/311 |
| 2009/0225717 A1 | 9/2009 | Banerjea | |
| 2010/0029289 A1 | 2/2010 | Love et al. | |
| 2010/0054158 A1 | 3/2010 | Mathai et al. | |
| 2010/0056136 A1 | 3/2010 | Zhu | |
| 2010/0081449 A1 | 4/2010 | Chaudhri et al. | |
| 2010/0128689 A1 | 5/2010 | Yoon et al. | |
| 2010/0159972 A1 | 6/2010 | Cho et al. | |
| 2010/0195584 A1 | 8/2010 | Wilhelmsson et al. | |
| 2010/0197235 A1 | 8/2010 | Wilhelmsson | |
| 2010/0304705 A1 | 12/2010 | Hursey | |
| 2010/0319033 A1 | 12/2010 | Juhani et al. | |
| 2011/0047230 A1 | 2/2011 | McGee | |
| 2011/0110255 A1 | 5/2011 | Park et al. | |
| 2011/0136497 A1 | 6/2011 | Youtz et al. | |
| 2011/0176497 A1 | 7/2011 | Gopalakrishnan | |
| 2011/0243047 A1 | 10/2011 | Dayal et al. | |
| 2012/0020256 A1 | 1/2012 | Tujkovic et al. | |
| 2012/0040715 A1 | 2/2012 | Fu et al. | |
| 2012/0082140 A1 | 4/2012 | Lin et al. | |
| 2012/0100860 A1 | 4/2012 | Lei et al. | |
| 2012/0164948 A1* | 6/2012 | Narasimha et al. | 455/63.1 |
| 2012/0314598 A1 | 12/2012 | Sadek et al. | |
| 2013/0122811 A1 | 5/2013 | Scribano et al. | |
| 2013/0170439 A1 | 7/2013 | Anderson et al. | |
| 2015/0180639 A1 | 6/2015 | Scribano et al. | |

FOREIGN PATENT DOCUMENTS

| | | |
|---|---|---|
| EP | 1392024 A2 | 2/2004 |
| EP | 2015462 A1 | 1/2009 |
| EP | 2 186 265 A1 | 5/2010 |
| WO | 2010039562 A1 | 4/2010 |
| WO | 2010/080669 A3 | 7/2010 |
| WO | 2010112066 A1 | 10/2010 |
| WO | 2010/141448 A1 | 12/2010 |
| WO | 2010/147719 A1 | 12/2010 |
| WO | 2011/017577 A2 | 2/2011 |
| WO | 2011072884 A1 | 6/2011 |
| WO | 2011/119750 A1 | 9/2011 |
| WO | 2011/123582 A1 | 10/2011 |
| WO | 2012/057590 A2 | 5/2012 |

OTHER PUBLICATIONS

"Co-existence issue for 700MHz digital dividend band," Motorola Solutions, 8.6.1, 3GPP TSG-RAN4#59AH, R4-113746, pp. 6, Jun. 27-Jul. 1, 2011.

International Search Report and Written Opinion for International Patent Application No. PCT/US2012/062574 dated Mar. 6, 2013.

International Search Report for International Patent Application No. PCT/US2012/069278 dated May 2, 2013.

International Search Report for International Patent Application No. PCT/US2013/021045 dated May 21, 2013.

Jing X. et al., "Spectrum co-existence of IEEE 802.11b and 802.16a networks using the CSCC etiquette protocol," First IEEE International Symposium on New Frontiers in Dynamic Spectrum Access Networks, pp. 243-250, Nov. 8-11, 2005.

Jing, X. et al., "Distributed Coordination Schemes for Multi-Radio Co-existence in Dense Spectrum Environments: An Experimental Study on the ORBIT Testbed," 3rd IEEE Symposium on New Frontiers in Dynamic Spectrum Access Networks, pp. 1-10, Oct. 14-17, 2008.

Jing, X., "Spectrum Co-ordination Protocols and Algorithms for Cognitive Radio Networks," pp. 119, Jan. 31, 2008 (Jan. 31, 2008). XP055043291.

Non-Final Office Action dated Jun. 7, 2013 in U.S. Appl. No. 13/340,057, Jeff S. Anderson, filed Dec. 29, 2011.

U.S. Appl. No. 13/295,963, filed Nov. 14, 201—Assignee: Motorola Solutions, Inc.

HP Invent—WiFi and bluetooth—Interference Issues—Jan. 2002.

Chiasserini C.F. and Rao R.R. et al., "Coexistence mechanishms for interference mitigation between IEEE 802.11.WLANs and Bluetooth," Twenty-First Annual Joint Conference of the IEEE Computer and Communications Societies. INFOCOM 2002 Proceedings, IEEE vol. 2, pp. 590-598.

Motorola Solutions : "B26 Uplink LTE UE to BS PS Co-Existence," 3GPP Draft; R4-113745 B26 UL LTE TO PS Co-Existence, 3rd Generation Partnership Project (3GPP) Mobile Competence Centre, Sophia-Antipolis Cedex, France, Jun. 22, 2011, pp. 1-6.

Motorola Solutions: "Co-Existence Study Involving PSNB Systems," 3GPP Draft; R4-B26AH-0043 PSNB Co-Existence, 3rd Generation Partnership Project (3GPP) Mobile Competence Centre, Sophia-Antipolis Cedex, France, Jan. 1, 2012, pp. 1-4.

Final Office Action dated Jan. 6, 2014, in U.S. Appl. No. 13/340,057, Anderson, J. S. et al., filed Dec. 29, 2011.

Advisory Action dated Apr. 22, 2014, in U.S. Appl. No. 13/340,057, Anderson, J. S. et al., filed Dec. 29, 2011.

Notice of Allowance dated Jan. 5, 2015, in U.S. Appl. No. 13/340,057, Anderson, J. S. et al., filed Dec. 29, 2011.

Notice of Allowance dated Mar. 24, 2015, in U.S. Appl. No. 13/340,057, Anderson, J. S. et al., filed Dec. 29, 2011.

Notice of Allowance dated Apr. 27, 2015, in U.S. Appl. No. 13/340,057, Anderson, J. S. et al., filed Dec. 29, 2011.

(56) References Cited

OTHER PUBLICATIONS

Notice of Allowance dated Dec. 23, 2014, in U.S. Appl. No. 13/295,963, Scribano, G. A. et al., filed Dec. 29, 2011.
Non-Final Office Action dated Apr. 24, 2015, in U.S. Appl. No. 14/631,885, Scriban, G. A. et al., filed Feb. 26, 2015.
Notice of Allowance dated Sep. 18, 2015, in U.S. Appl. No. 14/631,885, Scriban, G. A. et al., filed Feb. 26, 2015.
Patent Examination Report No. 1 dated Dec. 23, 2014, for Australian Patent Application No. 2012340003, filed Oct. 30, 2012.
Notice of Grant dated Aug. 27, 2015, for Australian Patent Application No. 2012340003, filed Oct. 30, 2012.
Patent Examination Report No. 1 dated Feb. 27, 2015, for corresponding Australian Patent Application No. 2013209991, filed Jan. 10, 2013.
Notice of Grant dated Oct. 1, 2015, for corresponding Australian Patent Application No. 2013209991, filed Jan. 10, 2013.
Office Action dated Jul. 29, 2015, in European Patent Application No. 12 787 592.0, filed Oct. 30, 2012.
Non-Final Office Action dated Jun. 23, 2014, in U.S. Appl. No. 13/601,432, Yacobi A.A. et al., filed Aug. 31, 2012.
Notice of Allowance dated Jan. 23, 2015, in U.S. Appl. No. 13/601,432, Yacobi A.A. et al., filed Aug. 31, 2012.
International Search Report and Written Opinion for International Patent Application No. PCT/US2013/055917, dated Jan. 8, 2014.
English Translation of the Office Action From the German Patent and Trademark Office, corresponding application No. 1120130000597.2, dated Dec. 12, 2016, all pages.
Office Action, Canadian Intellectual Property Office, related case No. 2855481, filed: Oct. 30, 2012, dated Aug. 23, 2016, all pages.
Canadian Examination Report, corresponding patent application No. 2861319, dated Oct. 12, 2017, all pages.

\* cited by examiner

US 10,264,587 B2

1

COLLABORATIVE INTERFERENCE MITIGATION BETWEEN PHYSICALLY-PROXIMATE NARROWBAND AND BROADBAND COMMUNICATION DEVICES

FIELD OF THE DISCLOSURE

The disclosure relates generally to wireless communications, and more particularly to collaborative interference mitigation between physically-proximate narrowband and broadband communication devices utilizing spectrally-proximate spectrum blocks.

BACKGROUND

The concept of signal interference is well known in the field of communications, and, more specifically, wireless communications. Many situations exist where signal interference between multiple wireless devices degrades the performance of one or more of the devices, based on signal strengths and/or the physical proximity of the devices.

For example, in the home, signals from a microwave oven, cordless phone, and wireless access point often interfere with each other. Depending on the relative strengths of the signals (i.e., weaker signals introduce less interference) and/or physical separation between the devices (i.e., signals weaken as the distance between the devices increases), the interference results in a slow download, the inability to communicate with a Web server, or a "bad" phone connection (i.e., unable to clearly hear the other party).

In some situations, the interference may be of little consequence, though annoying to most users. However, there are situations, such as those dealing with the wireless communication devices used by public safety personnel, where the interference has potentially problematic consequences, particularly when working in a hazardous environment.

For example, a police officer typically uses a two-way radio for communicating with a dispatcher or other officers on the same digital radio frequency. These digital radio communications are subject to interference by other wireless devices (e.g., cell phones, vehicular subscriber modems, etc.) that operate on nearby spectrum blocks, when the officer is near to these wireless devices. In such a situation, the officer's time-sensitive communications may become unclear, completely garbled, or delayed.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
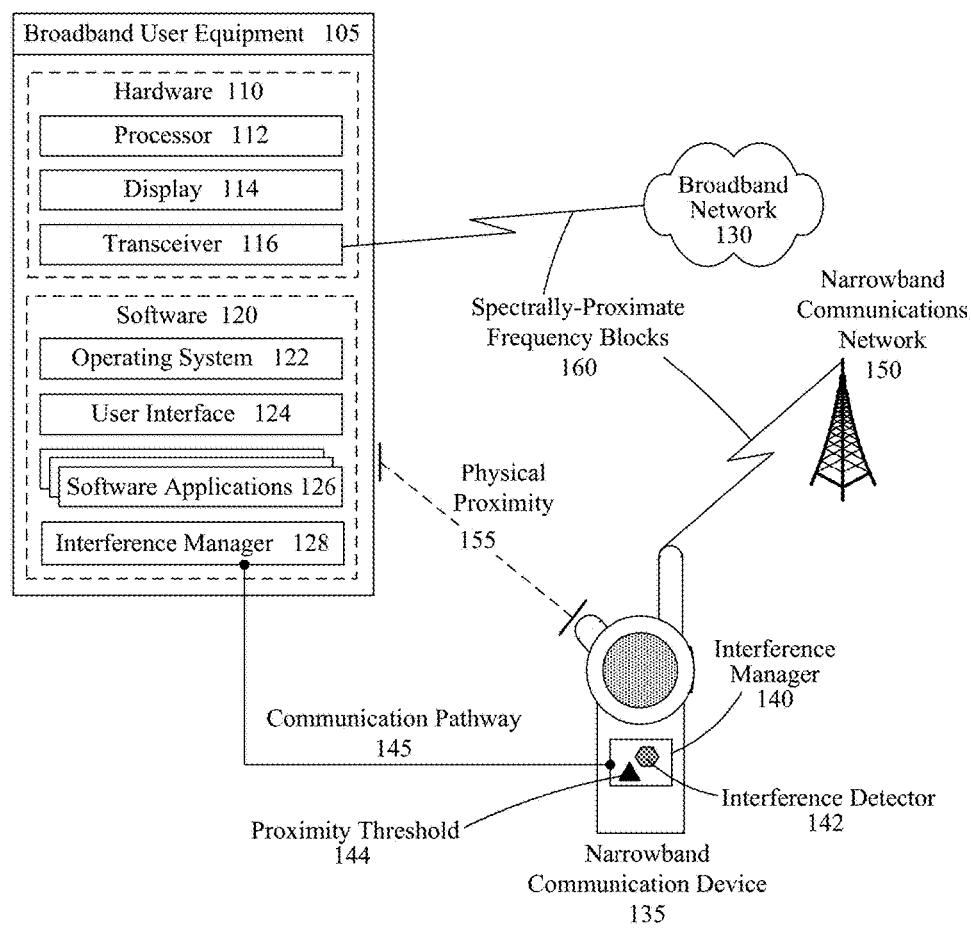
FIG. 1A illustrates a schematic diagram of a system for the collaborative interference mitigation between broadband user equipment and a narrowband communication device in accordance with embodiments of the inventive arrangements disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1B:
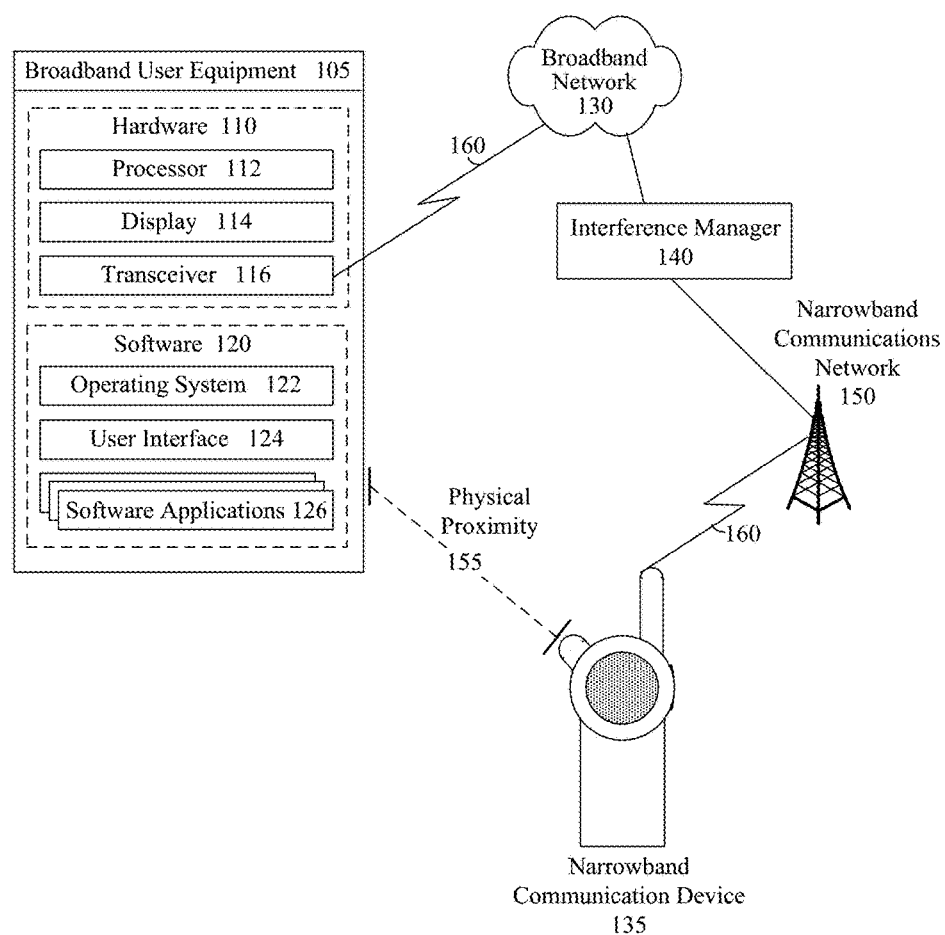
FIG. 1B shows an embodiment for collaborative interference migration where the interference manager is implemented in a distributed function.

FIG. 1A and FIG. 1B illustrate a schematic diagram of a system 100 for the collaborative interference mitigation between broadband user equipment 105 and a narrowband communication device 135 in accordance with embodiments of the inventive arrangements disclosed herein. In system 100, the broadband user equipment 105 and narrowband communication device 135 can utilize spectrally-proximate spectrum blocks 160 to send and receive communications.

The broadband user equipment 105 can represent a variety of computing devices capable of exchanging communications with a broadband network 130, including, but not limited to a hand-held computing device, a portable data assistant (PDA), a cell phone, a two-way radio, a smart phone, a laptop computer, a mobile data terminal (MDT), and the like.

The broadband network 130 can represent the hardware and/or software components required to implement a communications system that supports the use of a wide or broad range of frequencies or blocks. In one embodiment, the user equipment can be considered to conform to a network communication standard, such as a 3rd Generation Partnership Project (3GPP) standard such as Long Term Evolution (LTE), a 3rd Generation Partnership Project 2 (3GPP2) standard such as CDMA2000 or the IEEE 802.16 WiMAX standard. As used herein, a device (user equipment 105) exhibiting compliance with 3GPP, 3GPP2, and/or WiMAX refers to being compliant with a specific version of any of the specifications or derivatives thereof.

Broadband technology (broadband user equipment 105 and broadband network 130) is well known in the art, and, as such, only those details and functionality utilized by the present invention shall be discussed herein.

The broadband user equipment 105 can be comprised of various hardware 110 and software 120 components. It should be noted that the broadband user equipment 105 can include additional hardware 110 and software 120 components to support other functionality without affecting this embodiment of the present invention.

The hardware 110 components can include a processor 112, display 114, and a transceiver 116. The processor 112 can correspond to the electronic circuitry configured to interpret and execute the instructions of the software 120 components. The display 114 can represent a viewing area in which data can be presented to a user of the broadband user equipment 105.

The transceiver 116 can be the component configured to exchange data with the broadband network 130. The transceiver 116 can utilize the spectrum blocks associated with the specific provider of the broadband network 130.

The software 120 components of the broadband user equipment 105 can include an operating system 122, a user interface 124, software applications 126, and an interference manager 128. The operating system 122 can be the computer program configured to manage hardware 110 resources and provide a set of common services that support operation of the software applications 126. The software applications 126 can represent a variety of computer programs (e.g., computer-aided dispatch, push-to-talk, video communications, web browser, etc.) installed for use upon the broadband user equipment 105.

The user interface 124 can represent a specialized computer program designed to provide a basic interaction mechanism for a user. The user interface 124 can be abstractly thought of as a go-between for a user and the operating system 122 and/or software applications 126. That is, the user interface 124 can be for the broadband user equipment 105 and not a graphical user interface (GUI) of a specific software application 126.

The interference manager 128 can represent an additional component installed within the broadband user equipment 105 to collaboratively negotiate transmission interference between the broadband user equipment 105 and narrowband communication device 135.

The narrowband communication device 135 can represent an electronic device (e.g., two-way radio, land mobile radio, etc.) that communicates with other devices over a narrowband communications network 150. Since the technology regarding the narrowband communication device 135 and narrowband communications network 150 are well known in the art, only those details of particular import to the present invention shall be discussed herein.

The narrowband communication device 135 and narrowband communications network 150 can represent a system utilized by public safety organizations like those conforming to the Project 25 standards. For the sake of illustration, it can be assumed that the communications of public safety personnel, and, therefore, the narrowband communication device 135, are more important than those of the broadband user equipment 105.

Like the broadband user equipment 105, the narrowband communication device 135 can include an interference manager 140. When the broadband user equipment 105 and narrowband communication device 135 are within a physical proximity 155 where interference between communications made on spectrally-proximate spectrum blocks 160 is likely, the interference manager 140 of the narrowband communication device 135 and the interference manager 128 of the broadband user equipment 105 can exchange messages over an established communication pathway 145 to determine how to mitigate the potential interference.

Mitigation of the potential interference can be achieved by informing the broadband user equipment 105 to change the spectrum block that is currently being used for transmission. Should the broadband user equipment 105 be unable to switch to another spectrum block, the transmissions of the broadband user equipment 105 can be stopped or delayed until the narrowband communication device 135 is finished receiving its transmission.

The communication pathway 145 can represent a variety of communication methods and/or protocols. The type of communication pathway 145 established between the interference managers 128 and 140 can be dependent upon the specific capabilities and/or configurations of the broadband user equipment 105 and narrowband communication device 135.

The interference manager 140 of device 135 can include an interference detector 142 and a proximity threshold 144. The interference detector 142 can be the hardware and/or software elements that allow the narrowband communication device 135 to determine when the physical proximity 155 between the narrowband communication device 135 and the broadband user equipment 105 poses a potential for interference. The interference detector 142 can be implemented in a manner that is commensurate with the capabilities of the broadband user equipment 105 and narrowband communication device 135 and/or the communication pathway 145.

For example, the interference detector 142 can be a component that calculates the physical proximity 155 of the broadband user equipment 105 and narrowband communication device 135 based upon the signal strength of transmissions sent by the broadband user equipment 105. In another example, the interference detector 142 can include BLUETOOTH communication components that establish a BLUETOOTH communication pathway 145 that allows the broadband user equipment 105 and the narrowband communication device 135 to exchange data regarding location and transmission information. BLUETOOTH communications components (and others for communicating over communication pathway 145) can be considered short range wireless communication components. For example, a personal area network (PAN) transceiver is a short range wireless communication component. Communications over pathway 145 can be direct communications between the user equipment 105 and the device 135 with no need for intermediate routing.

The proximity threshold 144 can define a maximum physical proximity 155 separating the broadband user equipment 105 and the narrowband communication device 135 where transmission interference can occur. The value for the proximity threshold 144 can be hard-coded or can be a user-configurable setting. User-configurability of the proximity threshold 144 can allow the interference manager 140 to be fine-tuned on a user or situational basis (i.e., static vs. transient co-located devices).

For example, Officer A always carries broadband user equipment 105 and a narrowband communication device 135. Therefore, Officer A can specify a lower proximity threshold 144 since the devices 105 and 135 have a close physical proximity 155 (static co-location). Officer B, who only carries a narrowband communication device 135, can set a higher proximity threshold 144 to account for entering/leaving the broadcast range of various broadband user equipment 105 while working (transient co-location). In another embodiment, the interference detector can detect interference by inference when, for example, when the control channel of a narrowband communication network 150 cannot be detected. In yet another embodiment, the interference manager will examine the received signal strength indication (RSSI) on various narrowband channels to detect a rise in noise floor that may be indicative of interference. In a further embodiment, the broadband interference manager will alert the narrowband interference manager that broadband transmission is taking place and the narrowband interference manger will scan unused narrowband frequencies to measure for a rise in noise floor, which, again, may be indicative of the presence of interference.

Broadband and narrowband communications networks 130 and 150 can include any hardware/software/and firmware necessary to convey data encoded within carrier waves. Data can be contained within analog or digital signals and conveyed though data or voice channels. Broadband and narrowband communications networks 130 and 150 can include local components and data pathways necessary for communications to be exchanged among computing device components and between integrated device components and peripheral devices. Broadband and narrowband communications networks 130 and 150 can also include network equipment, such as routers, data lines, hubs, and intermediary servers which together form a data network, such as the Internet. Broadband and narrowband communications networks 130 and 150 can also include circuit-based communication components and mobile communication components, such as telephony switches, modems, cellular communication towers, and the like.

Communications between the broadband user equipment 105 and the narrowband communication device 135 over the communication pathway 145 can be bidirectional. For example, the broadband user equipment 105 can convey transmission data to the narrowband communication device 135 over pathway 145 and vice versa. Conveyance of this transmission data can be responsive to requests from the other device.

In one embodiment, whether interference exists between the broadband user equipment 105 and the narrowband communication device 135 can be uncertain or can be based on a definable statistical probability value or likelihood. Thus, a decision on whether to take interference mitigation actions can be based on whether interference is likely or unlikely, as defined by whether a statistical probability of interference is greater or less than an established threshold value. When no interference mitigation action is necessary (e.g., interference is unlikely) the broadband user equipment 105 may not need to take any actions to mitigate interference, meaning that the device transmission settings of the UE 105 are unaffected by narrowband device 135 (or have not been changed from a default responsive to messages received over pathway 145).

FIG. 1B shows an embodiment for collaborative interference migration where the interference manager 140 is implemented in a distributed function. That is, interference manager 140 can be considered a distributed function that can reside wholly in one radio or another or even in neither radio.

As shown by FIG. 1B, the interference manager 140 (or portions thereof) resides outside the broadband and narrowband systems and uses the broadband and narrowband systems to communicate location, signal power, frequency, etc. to the interference manager 140. The interference manager 140 than can determine whether interference will exist between proximate radio devices 105, 135 and can signal the broadband 130 and narrowband 150 networks with interference mitigation instructions. Such instructions may include, the narrowband frequency assigned to a particular narrowband call, instructions for the base station scheduler for the broadband radio so as to reduce the interference of the broadband transmission sufficiently to prevent interference to collocated narrowband receivers or, that not being possible, to shutdown or force the broadband radio 105 to roam. In this way, the interference manager 140 can manage the interference for many radios at once.

Figure 2:
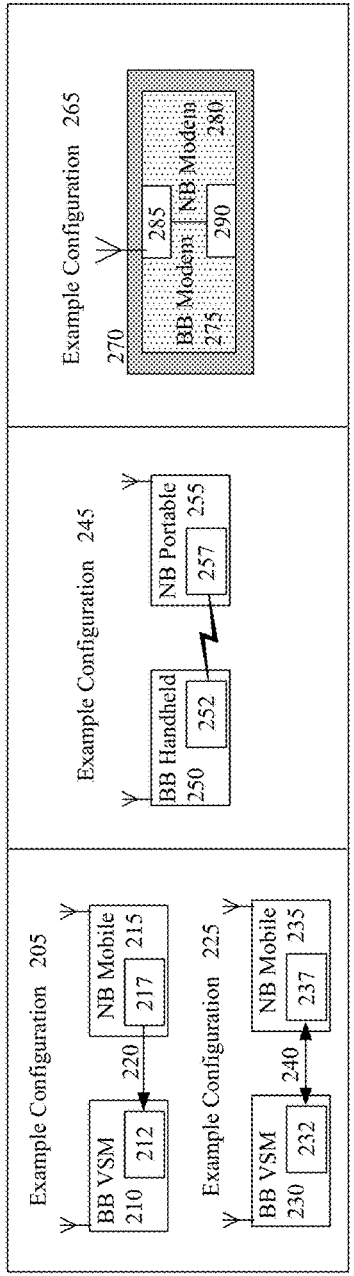
FIG. 2 is a collection of schematic diagrams depicting example configurations of co-located broadband and narrowband communication devices where transmission interference is mitigated in accordance with embodiments of the inventive arrangements disclosed herein.

FIG. 2 is a collection 200 of schematic diagrams depicting example configurations 205, 225, 245, and 265 of co-located broadband and narrowband communication devices where transmission interference is mitigated in accordance with embodiments of the inventive arrangements disclosed herein. The schematic diagrams of collection 200 can represent configurations of system 100 of FIG. 1A or 1B.

As used herein, the terms broadband user equipment and broadband communication device can be used interchangeably without expressing limitation to or a specific embodiment of the present invention.

Example configurations 205 and 225 can illustrate embodiments where a broadband (BB) vehicular subscriber modem (VSM) 210 and 230 and a narrowband (NB) mobile device 215 and 235 are co-located (i.e., BB and NB communication components installed within the same public safety vehicle). In configuration 205, the interference manager 217 of the NB mobile device 215 can be connected to the interference manager 212 of the BB VSM 210 via a uni-directional data cable 220. Therefore, in configuration 205, interference mitigation can be dictated by the NB mobile 215; the NB mobile 215 can indicate to the BB VSM 210 to change its spectrum block or halt transmission.

In configuration 225, the interference managers 232 and 237 can be connected using a bi-directional data cable. This configuration 225 can allow for information to be exchanged between the BB VSM 230 and NB mobile device 235. As such, the interference manager 237 of the NB mobile 235 can take into account the current operational state of the BB VSM 230 when determining how best to mitigate interference.

Example configuration 245 can illustrate a BB handheld device 250 (e.g., smart phone) and a NB portable device 255 (e.g., digital radio) that are within close proximity of each other. In this configuration, the interference managers 252 and 257 can be connected by an out-of-band wireless communication technology, such as BLUETOOTH. Like example configuration 225, communication between the interference managers 252 and 257 of configuration 245 can be bi-directional.

Example configuration 265 can represent a single communication device 270 having both an integrated BB modem 275 and an integrated NB modem 280. Mitigating interference can be performed internally by a single interference manager 290.

Figure 3:
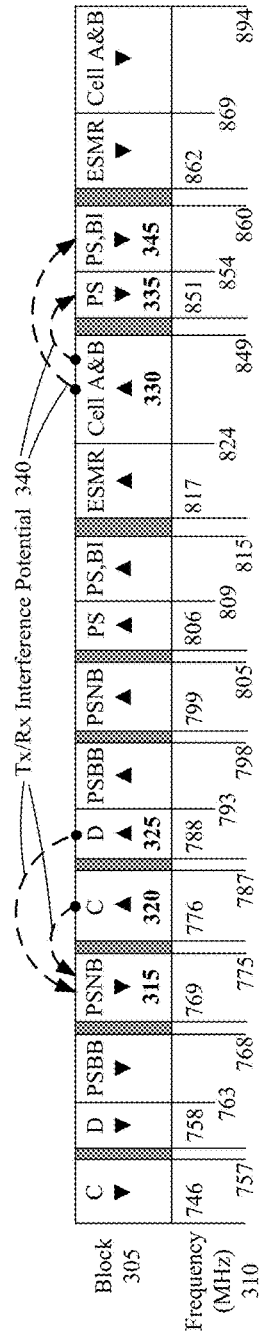
FIG. 3 is a spectrum block diagram showing the interference potential between broadband (BB) and narrowband (NB) communications in accordance with embodiments of the inventive arrangements disclosed herein.

FIG. 3 is a spectrum block diagram 300 showing the interference potential 340 between broadband (BB) and narrowband (NB) communications in accordance with embodiments of the inventive arrangements disclosed herein. Spectrum block diagram 300 can be utilized by devices 105 and 135 in system 100 and the configurations 205, 225, 245, and 265 of collection 200.

Spectrum block diagram 300 can visually illustrate the frequency 310 ranges for the spectrum blocks 305 used by broadband and narrowband communication devices in the 700-800 MHz frequency spectrum. The spectrum blocks 305 of import to the present invention can include C-Block transmission 320, D-Block transmission 325, and Cellular A&B block transmission 330 used by a broadband device and the receiving blocks 315, 335, and 345 used by public safety (PS) narrowband communication devices.

It should be noted that the frequency spectrum shown in spectrum block diagram 300 is for illustrative purposes only, and is not meant as a limitation of the present invention. That is, the present invention can be applied to other spectrally-proximate spectrum blocks that have the potential to interfere with each other that are outside of the 700-800 MHz range.

Since many narrowband communication devices utilize a half-duplex configuration (i.e., does not transmit, Tx, when receiving, Rx), transmissions sent by a broadband device using C-Block 320, D-Block 325, and/or Cellular A&B Block 330 can occur simultaneous with narrowband transmissions without causing interference. The potential 340 for interference can exist when transmissions sent by a broadband device using C-Block 320, D-Block 325, and/or Cellular A&B Block 330 occur when the narrowband device is receiving transmissions, as indicated by the arrows.

The Tx/Rx interference potential 340 can be attributed to spectral proximity of the C-Block 320, D-Block 325, and Cellular A&B Block 330 transmit frequency 310 ranges to the narrowband device receiving frequency 310 range. As shown in the spectrum block diagram 300, the minimum frequency 310 for a C-Block 320 transmission can be only 2 MHz away from the maximum frequency 310 of the PSNB reception spectrum block 315; a D-Block 325 transmission can be separated from the PSNB reception spectrum block 315 by 13 MHz.

Further, should the broadband device roam into the Cellular A&B Block 330, interference can be likely since there is only a 2 MHz separation from the PS reception spectrum block 335 and a 5 MHz separation for the interleaved band 345.

Figure 4:
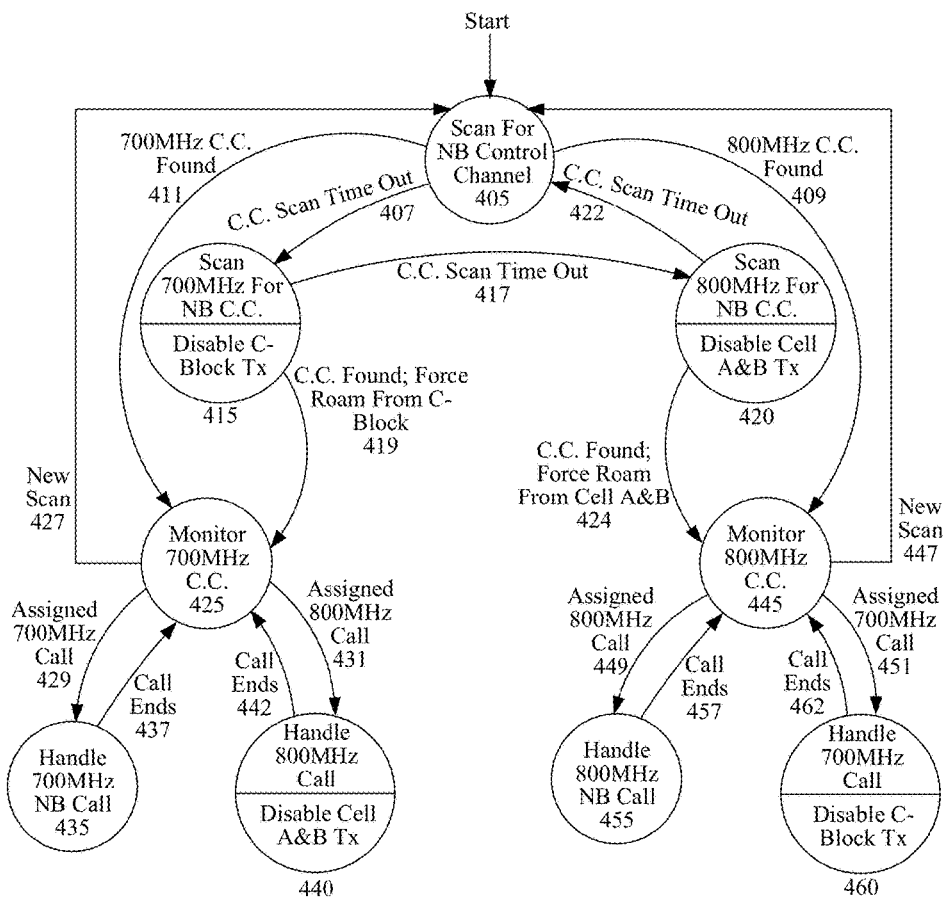
FIG. 4 is a state flow diagram describing the state changes of a narrowband communication device when mitigating interference via unidirectional communication to a separate, co-located broadband communication device in accordance with embodiments of the inventive arrangements disclosed herein.

FIG. 4 is a state flow diagram 400 describing the state changes of a narrowband communication device when mitigating interference via unidirectional communication to a separate, co-located broadband communication device in accordance with embodiments of the inventive arrangements disclosed herein. State diagram 400 can be utilized within the context of system 100 and/or example configuration 205.

In state diagram 400, the narrowband communication device can begin in state 405 where it can scan for a narrowband control channel (C.C.). For the sake of example, the narrowband communication device can be configured to scan the 700-800 MHz frequency range.

From state 405, the narrowband communication device can enter one of three possible states 415, 425, or 445. In state 405, when a control channel is found 411 in the 700 MHz frequency range, the narrowband communication device can transition to state 425; when a control channel is found 409 in the 800 MHz frequency range, state 445 can be entered. State 415 can be reached should the scan for a control channel time out 407 (i.e., the narrowband communication device be unable to find a control channel after a predefined time period).

In state 415, the narrowband communication device can instruct the broadband communication device to disable its C-Block transmissions and the narrowband communication device can then scan the 700 MHz frequency range for a control channel. This can minimize the broadband communication device's C-Block transmission interference with the narrowband communication device's ability to receive transmissions in the 700 MHz frequency range.

From state 415, should the narrowband communication device's scan for a control channel in the 700 MHz range time out 417, the narrowband communication device can rescind the disable instruction to the broadband communication device and enter state 420; or, should a control channel be found 419, the narrowband communication device can instruct the broadband communication device to roam from C-Block so the narrowband communication device can enter state 425. The spectrum block to which to roam can be determined by the broadband communication device. Typical choices can include D-Block, cellular A&B, and 1.8 GHz cellular.

In state 425, the narrowband communication device can monitor the control channel that was found in the 700 MHz frequency range. From state 425, the narrowband communication device can be assigned a call to handle 429 and 431 or may need to perform a new scan 427 for a control channel (i.e., mobility triggers, broadband communication device roaming to spectrally-proximate spectrum block). The need to perform a new scan 427 can cause the narrowband communication device to rescind the disable instruction to the broadband communication device and return to state 405 to restart the control channel scanning process.

When the narrowband communication device is assigned 429 a call in the 700 MHz frequency range in state 425, the narrowband communication device can transition to state 435 to handle the call and return to state 425 once the call ends 437. When assigned 431 a call in the 800 MHz frequency range in state 425, the narrowband communication device can transition to state 440.

In state 440, the narrowband communication device can instruct the broadband communication device to disable its cellular A&B transmissions to avoid interference while the narrowband communication device handles the call. Once the 800 MHz call ends 442, the narrowband communication device can rescind the disable instruction to the broadband communication device and transition from state 440 back to state 425.

When the narrowband communication device is in state 420, the broadband communication device can be instructed to disable its transmission in the cellular A&B block while the narrowband communication device scans the 800 MHz frequency range for a control channel. Should the scan for a control channel in the 800 MHz range time out 422, the narrowband communication device can rescind the disable instruction to the broadband communication device and transition from state 420 back to state 405 to repeat this scanning procedure.

When a control channel is found 424 in the 800 MHz frequency range, the narrowband communication device can transition from state 420 to state 445 and the broadband communication device can be instructed to roam from the cellular A&B block. In state 445, the narrowband communication device can monitor the control channel that was found in the 800 MHz frequency range. From state 445, the narrowband communication device can be assigned a call to handle 449 and 451 or may need to perform a new scan 447 for a control channel. The need to perform a new scan 447 can cause the narrowband communication device to rescind the disable instruction to the broadband communication device and return to state 405 to restart the control channel scanning process.

When the narrowband communication device is assigned 449 a call in the 800 MHz frequency range in state 445, the narrowband communication device can transition to state 455 to handle the call and return to state 445 once the call ends 457. When assigned 451 a call in the 700 MHz frequency range in state 445, the narrowband communication device can transition to state 460.

In state 460, the narrowband communication device can instruct the broadband communication device to disable its C-Block transmissions to avoid interference while the narrowband communication device handles the call. Once the 700 MHz call ends 462, the narrowband communication device can rescind the disable instruction to the broadband communication device and transition from state 460 back to state 445.

It should be noted that the disabling of transmissions being made by the broadband communication device can be at the discretion of the broadband communication device and can be achieved in various ways, and, that these variety of ways can be applicable in different situations. For example, since messaging in long-term evolution (LTE) environment is quite fast, a LTE base station can be instructed to buffer or delay a transmission before the narrowband communication device begins to receive its transmission.

Further, the signaling between the narrowband and broadband communication devices can be implemented in various manners. In one contemplated embodiment, two binary signals, representing C-Block and cellular A&B block, can be used with logical "1" indicating to disable the corresponding transmitter and logical "0" to enable the transmitter.

In another embodiment, the signaling can utilize a data protocol having commands, such as "C Block Disable", "Clear Disable", "Roam Off C Block" and "Clear Roam", and, optionally, acknowledgements that can be conveyed between the narrowband and broadband communication devices using a data bus.

Figure 5:
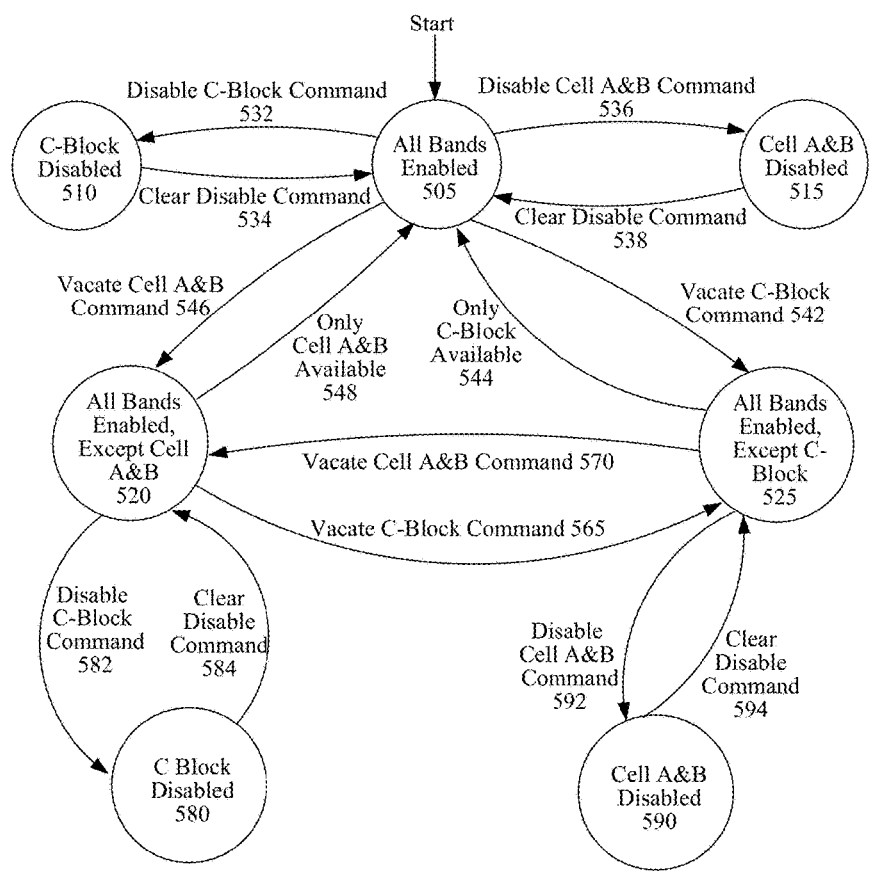
FIG. 5 is a state flow diagram describing the state changes of a broadband communication device when mitigating interference via communications from a separate, co-located narrowband communication device in accordance with embodiments of the inventive arrangements disclosed herein.

FIG. 5 is a state flow diagram 500 describing the state changes of a broadband communication device when mitigating interference via communications from a separate, co-located narrowband communication device in accordance with embodiments of the inventive arrangements disclosed herein. In various embodiments, diagram 500 can apply to unidirectional and/or bidirectional data flow. State diagram 500 can be utilized within the context of system 100, example configurations 205 and/or 245, and/or in conjunction with state flow diagram 400. It should be noted that for embodiments having integrated devices where there is only one interference manager (configuration 265, for example) the state flow shown by diagram 500 is not needed.

In state diagram 500, the broadband communication device can begin in state 505 all frequency bands enabled. For the sake of example, the broadband communication device can be configured to utilize frequency bands in the 700-800 MHz frequency range. While in state 505, the broadband communication device can connect over various bands as its network selection policy dictates.

When a disable C-Block command 532 is received from the narrowband communication device, the broadband communication device can enter state 510 where C-Block transmission has been disabled. C-Block transmissions can remain disabled until a clear disable command 534 has been received from the narrowband communication device and the broadband communication device can transition from state 510 back to state 505.

Likewise, when a disable cellular A&B command 536 is received from the narrowband communication device, the broadband communication device can enter state 515 where transmissions using the cellular A&B block are disabled. When a clear disable command 538 is received from the narrowband communication device, the broadband communication device can return to state 505 from state 515.

While in state 505, the broadband communication device can receive a vacate (i.e., roam off of) C-Block command 542 from the narrowband communication device, causing the broadband communication device to enter state 525. The broadband communication device can then perform its network selection based on its network selection policy, assuming that C-Block is unavailable for use. If C-Block is the only service available 544, the broadband communication device can immediately transition back to state 505 and the process begins again.

When other blocks are available for use, the broadband communication device can remain in state 525. From state 525, the broadband communication device can transition to state 590 when a disable cellular A&B command 592 is received from the narrowband communication device, returning to state 525 when the clear disable command 594 is received.

Similarly, the broadband communication device can be sent a vacate cellular A&B block command 546 from the narrowband communication device, causing the broadband communication device to enter state 520. The broadband communication device can then perform its network selection based on its network selection policy, assuming that the cellular A&B block is unavailable for use. If the cellular A&B block is the only service available 548, the broadband communication device can immediately transition back to state 505.

When other blocks are available for use, the broadband communication device can remain in state 520. From state 520, the broadband communication device can transition to state 580 when a disable C-Block command 582 is received from the narrowband communication device, returning to state 520 when the clear disable command 584 is received.

When in state 520 or state 525, the broadband communication device can be instructed to vacate its current spectrum block 565 and 570 again. Thus, it is possible for the broadband communication device to transition between states 520 and 525.

States other than the starting state 505 can also include a timer (not shown) that can return the broadband communication device to state 505 (i.e., restart) after a predefined time period of inactivity to prevent the broadband communication device from stagnating in a state.

Figure 6:
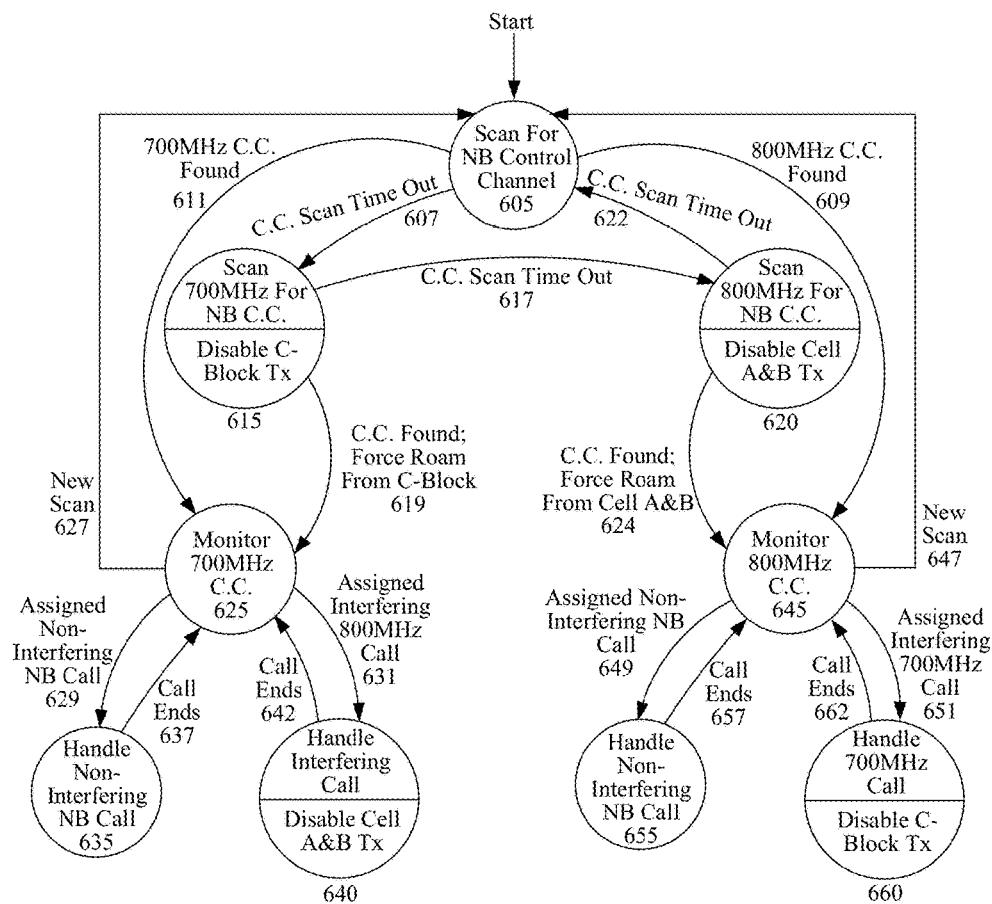
FIG. 6 is a state flow diagram describing the state changes when mitigating interference in accordance with embodiments of the inventive arrangements disclosed herein.

FIG. 6 is a state flow diagram 600 describing the state changes of a narrowband communication device when mitigating interference via bidirectional communication with a separate, co-located broadband communication device in accordance with embodiments of the inventive arrangements disclosed herein. State diagram 600 can be utilized within the context of system 100 and/or example configurations 225, 245, and/or 265.

It should be noted that, although state flow diagram 600 is similar to state flow diagram 400, the bidirectional data exchange capability between the narrowband and broadband communication devices can introduce some subtle nuances to when transmissions of the broadband communication device are disabled.

It is assumed that the broadband communication device can provide the narrowband communication device with relevant information about its transmissions like the frequency and transmit power of its various transmitters so the narrowband communication device can determine if transmission interference is likely. Additionally, the narrowband communication device can be capable of measuring the power of the control channel that it is monitoring as well as have the BB-to-NB antenna path loss preprogrammed and accessible for use.

In state diagram 600, the narrowband communication device can begin in state 605 where it can scan for a narrowband control channel (C.C.). For the sake of example, the narrowband communication device can be configured to scan the 700-800 MHz frequency range.

From state 605, the narrowband communication device can enter one of three possible states 615, 625, or 645. In state 605, when a control channel is found 611 in the 700 MHz frequency range, the narrowband communication device can transition to state 625; when a control channel is found 609 in the 800 MHz frequency range, state 645 can be entered. State 615 can be reached should the scan for a control channel time out 607 (i.e., the narrowband communication device be unable to find a control channel after a predefined time period).

In state 615, the narrowband communication device can instruct the broadband communication device to disable its C-Block transmissions and the narrowband communication device can then scan the 700 MHz frequency range for a control channel. This can minimize the broadband communication device's C-Block transmission interference with the narrowband communication device's ability to receive transmissions in the 700 MHz frequency range.

From state 615, should the narrowband communication device's scan for a control channel in the 700 MHz range time out 617, the narrowband communication device can rescind the disable instruction to the broadband communication device and enter state 620; or, should a control channel be found 619, the narrowband communication device can instruct the broadband communication device to roam from C-Block so the narrowband communication device can enter state 625. The spectrum block to which to roam can be determined by the broadband communication device. Typical choices can include D-Block, cellular A&B, and 1.8 GHz cellular.

In state 625, the narrowband communication device can monitor the control channel that was found in the 700 MHz frequency range. From state 625, the narrowband communication device can be assigned a call to handle 629 and 631 or may need to perform a new scan 627 for a control channel (i.e., mobility triggers, broadband communication device roaming to spectrally-proximate spectrum block). The need to perform a new scan 627 can cause the narrowband communication device to rescind the disable instruction to the broadband communication device and return to state 605 to restart the control channel scanning process.

When assigned a call in the 700 MHz frequency range in state 625, the narrowband communication device can immediately transition to state 635 to handle the non-interfering narrowband call 629 and return to state 625 once the call ends 637 (i.e., interference in the 700 MHz range was already cleared by forcing the broadband communication device to roam away from C-Block). When assigned a call in the 800 MHz frequency range in state 625, the narrowband communication device can first determine if the assigned 800 MHz call will encounter interference from the transmissions of the broadband communication device.

For example, the narrowband communication device can use the BB transmitter power, the BB transmitter frequency, the control channel received power, the voice channel receive frequency, and the antenna isolation in conjunction with a lookup table to determine if the 800 MHz BB transmitter will interfere with the NB receiver.

When the broadband communication device's transmission is determined as not interfering with the assigned 800 MHz call, the narrowband communication device can transition to state 635 to handle the assigned 629 non-interfering 800 MHz call. However, when it is determined that the broadband communication device will interfere with the assigned 800 MHz call 631, the narrowband communication device can enter state 640.

In state 640, the narrowband communication device can instruct the broadband communication device to disable its cellular A&B transmissions to avoid interference while the narrowband communication device handles the assigned 800 MHz call. Once the 800 MHz call ends 642, the narrowband communication device can rescind the disable instruction to the broadband communication device and transition from state 640 back to state 625.

When the narrowband communication device is in state 620, the broadband communication device can be instructed to disable its transmission in the cellular A&B block while the narrowband communication device scans the 800 MHz frequency range for a control channel. Should the scan for a control channel in the 800 MHz range time out 622, the narrowband communication device can rescind the disable instruction to the broadband communication device and transition from state 620 back to state 605 to repeat this scanning procedure.

When a control channel is found 624 in the 800 MHz frequency range, the narrowband communication device can transition from state 620 to state 645 and the broadband communication device can be instructed to roam from the cellular A&B block. In state 645, the narrowband communication device can monitor the 800 MHz frequency range for call assignments 649 and 651 or can need to perform a new scan 647 for a control channel. The need to perform a new scan 647 can cause the narrowband communication device to rescind the disable instruction to the broadband communication device and return to state 605, restarting the control channel scanning process.

The handling of call assignments in state 645 can mirror the process discussed with respect to state 625. When assigned a call in the 800 MHz frequency range in state 645, the narrowband communication device can immediately transition to state 655 to handle the non-interfering narrowband call 649 and return to state 645 once the call ends 657 (i.e., interference in the 800 MHz range was already cleared by forcing the broadband communication device to roam away from the cellular A&B block).

When assigned a call in the 700 MHz frequency range in state 645, the narrowband communication device can first determine if the assigned 700 MHz call will encounter interference from the transmissions of the broadband communication device. When the broadband communication device's transmission is determined as not interfering with the assigned 700 MHz call, the narrowband communication device can transition to state 655 to handle the assigned 649 non-interfering 700 MHz call.

When it is determined that the broadband communication device will interfere with the assigned 700 MHz call 651, the narrowband communication device can enter state 660. In state 660, the narrowband communication device can instruct the broadband communication device to disable its C-Block transmissions to avoid interference while the narrowband communication device handles the call. Once the 700 MHz call ends 662, the narrowband communication device can rescind the disable instruction to the broadband communication device and transition from state 660 back to state 645.

Due to the bidirectional communication pathway, this approach can have the added benefit of not disabling the transmissions of the broadband communication device unless it has been determined that the transmissions will interfere with the narrowband calls. This approach can also reduce the interference of narrowband-to-broadband transmissions.

Figure 7:
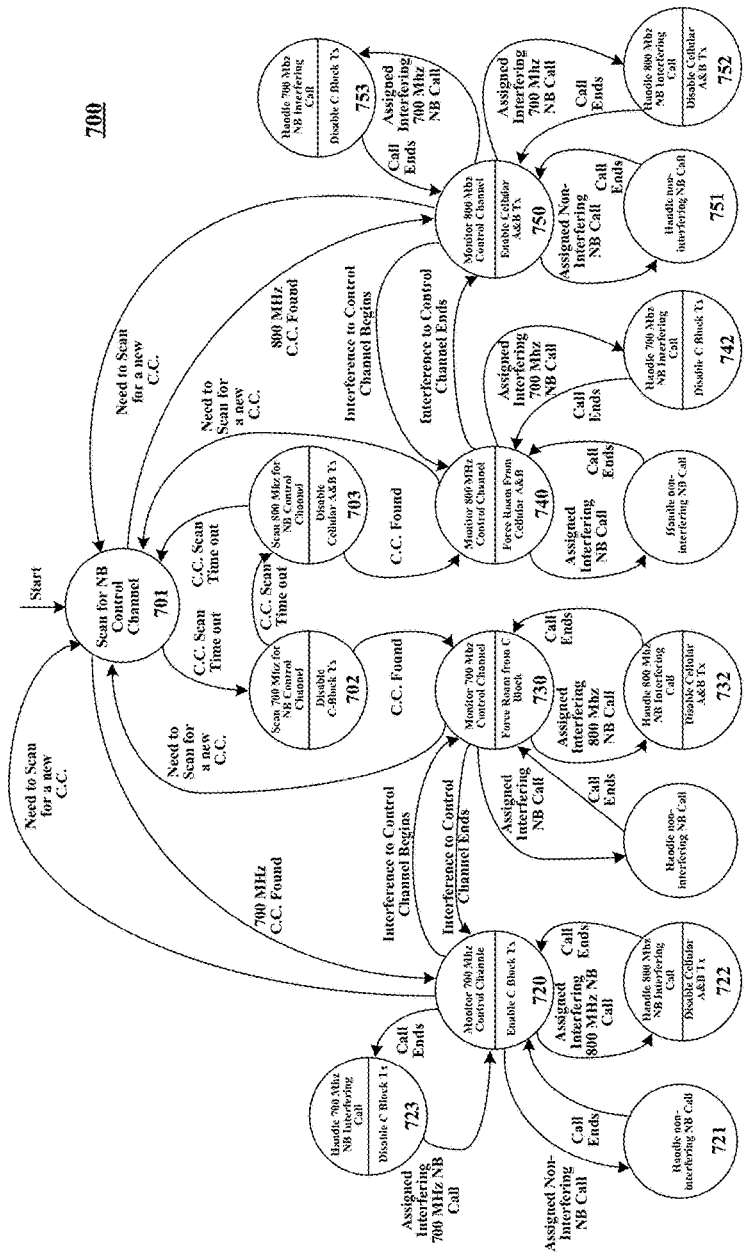
FIG. 7 is a state flow diagram describing the state changes when mitigating interference in accordance with embodiments of the inventive arrangements disclosed herein.

FIG. 7 is the same as FIG. 6 except that two additional Monitor Control Channel states are used along with additional call handling states attached to the new monitor control channel states.

If the control channel scan finds a control channel while in state 701, that is, without disabling the broadband transmitters, then the control channels are monitored without roaming away from the broadband spectrum. In other words, finding the control channel without disabling the broadband transmitters indicates that the broadband transmitters do not interfere with the control channel reception given the particular frequency of the control channel and the current conditions of narrowband receive power and broadband transmitter power.

If a 700 MHz control channel is found without disabling the broadband transmitters state 720 is entered and the 700 MHz control channel is monitored without forcing the broadband radio to roam away from C Block. If a call is assigned to the narrowband radio and, based on the assigned frequency and the received signal strength (assume the received signal strength of the narrowband call channel is the same as the narrowband control channel) state 721 is entered. If the narrowband radio is assigned a call channel that will be interfered with by the C Block broadband transmitter state 723 is entered and the C Block transmitter is disabled. Alternatively, if the narrowband radio is assigned a call channel that will be interfered with by the Cellular A&B broadband transmitter state 722 is entered and the Cellular A&B transmitter is disabled. When the call ends the broadband transmitters are enabled again. So here, the broadband radio isn't forced to roam if it will not interfere with the narrowband control channel.

On the other hand, if the narrowband control channel cannot be found in state 701, state 702 is entered and the C Block transmitter is disabled while the narrowband radio scans for a 700 MHz control channel. If the control channel is found it is assumed that control channel is interfered with by the C Block transmitter and the broadband radio is forced to roam off of C Block while the narrowband radio monitors its control channel in state 730. If a narrowband call is assigned to a 700 MHz frequency or a non-interfering 800 MHz call is assigned, the narrowband radio handles the call without disabling any broadband transmitters. If an 800 MHz channel is assigned for the narrowband call and the lookup table indicates that the collocated broadband radio is transmitting a signal in the Cellular A&B band that will interfere with the narrowband reception, state 732 is entered and the Cellular A&B transmitter is forced to shut down until the narrowband call is over.

The difference between states 720 and 730 is that 720 allows the C Block transmitter to operate while the narrowband radio monitors its 700 MHz control channel while 730 forces the narrowband radio to roam away from C Block.

It is also possible that conditions will conditions will change from the time the control channel scan took place. For example, interference may not have been present when the control channel scan took place in state 701 so the narrowband radio entered state 720. However, since that time the car may have moved farther from the narrowband site, so that the received narrowband signal is weaker and thus more vulnerable to interference, and the car also may have moved farther from the broadband site so that the broadband radio has increased is transmitter power level in response to its power control algorithm, so that the broadband radio is more apt to cause interference. If this occurs and the narrowband radio detects interference, it will transition from state 720 to state 730. Likewise, the narrowband radio can transition from state 730 to state 720 if it detects for example, an increase in the received power of the narrowband signal which results in the cessation of interference.

The left side of the process is identical to that which occurs on the right side of FIG. 7 except that the right side of FIG. 7 is conditioned on the narrowband control channel being in the 800 MHz band.

That is, if a 800 MHz control channel is found without disabling the broadband transmitters state 750 is entered and the 800 MHz control channel is monitored without forcing the broadband radio to roam away from A&B Block. If a call is assigned to the narrowband radio and, based on the assigned frequency and the received signal strength (assume the received signal strength of the narrowband call channel is the same as the narrowband control channel) state 751 is entered. If the narrowband radio is assigned a call channel that will be interfered with by the C Block broadband transmitter state 753 is entered and the C Block transmitter is disabled. Alternatively, if the narrowband radio is assigned a call channel that will be interfered with by the Cellular A&B broadband transmitter state 752 is entered and the Cellular A&B transmitter is disabled. When the call ends the broadband transmitters are enabled again. So here, the broadband radio isn't forced to roam if it will not interfere with the narrowband control channel.

On the other hand, if the narrowband control channel cannot be found in state 701, state 703 is entered and the A&B Block transmitter is disabled while the broadband radio scans for a 800 MHz control channel. If the control channel is found it is assumed that control channel is interfered with by the C Block transmitter and the broadband radio is forced to roam off of C Block while the narrowband radio monitors its control channel in state 740. If a narrowband call is assigned to a 700 MHz frequency or a non-interfering 800 MHz call is assigned, the narrowband radio handles the call without disabling any broadband transmitters. If a 700 MHz channel is assigned for the narrowband call and the lookup table indicates that the collocated broadband radio is transmitter a signal in the C Block band that will interfere with the narrowband reception, state 742 is entered and the C Block transmitter is forced to shut down until the broadband call is over.

The difference between states 750 and 740 is that 750 allows Cellular A&B transmissions while the broadband radio monitors its 800 MHz control channel while 740 forces the broadband radio to roam away from Cellular A&B Block.

It is also possible that conditions will conditions will change from the time the control channel scan took place. For example, interference may not have been present when the control channel scan took place in state 701 so the broadband radio entered state 750. However, since that time the car may have moved farther from the broadband site, so that the received broadband signal is weaker and thus more vulnerable to interference, and the car also has moved farther from the narrowband site so that the narrowband radio has increased is transmitter power level in response to its power control algorithm, so that the broadband radio is more apt to cause interference. If this occurs and the narrowband radio detects interference, it will transition from state 750 to state 740. Likewise, the narrowband radio can transition from state 740 to state 750 if it detects for example, an increase in the received power of the narrowband signal which results in the cessation of interference.

The arrangements of the disclosure are believed to have numerous advantages over conventional techniques. Specifically, the disclosure permits broadband and narrow band devices to operate in proximity to each other (or within a single device) without signal interference between the devices. Signal interference is avoided through communications between the broadband and the narrowband components and/or devices. That is, by coordinating when and on what band each of the broadband and narrowband devices are communicating, interference can be avoided and/or minimized.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A narrowband portable communication device operating in a narrowband network, the narrowband portable communication device comprising:
a processor that is configured to:
scan for a first narrowband control channel in a 700 MHz narrowband frequency range;
monitor the first narrowband control channel when found in the 700 MHz narrowband frequency range;
send an instruction, using a direct communication pathway without intermediate routing, to a separate, co-located and spectrally-proximate broadband handheld communication device operating in a broadband network, the instruction being to one or more of disable a C-Block broadband transmission or roam from the C-block broadband transmissions;
receive an assignment to a call in a 800 MHz narrowband frequency range; and send a disable instruction, using the direct communication pathway without intermediate routing, in response to receiving the assignment to the call, instructing the broadband handheld communication device to disable A&B cellular broadband transmissions thereby avoiding potential RF interference from the broadband handheld device to the narrowband portable communication device while the narrowband portable communication device handles the call.

2. The portable communication device of claim 1, wherein the processor is configured to:
terminate the call in the 800 MHz narrowband frequency range;
send a message over the direct communication pathway without intermediate routing to the broadband communication channel to rescind the disable instruction that instructed the broadband handheld communication device to disable A&B cellular broadband transmissions; and
in response to the termination of the call, monitor the first narrowband control channel.

3. A method for mitigating interference by a narrowband portable communication device operating in a narrowband network, the method comprising:
begin scanning at the narrowband communication device for a narrowband control channel, by the narrowband portable communication device via unidirectional communication, without intermediate routing, to a separate, co-located and spectrally-proximate broadband communication device operating in a broadband network, within a 700 MHz narrowband frequency range and an 800 MHz narrowband frequency range;
the narrowband portable communication device entering one of three states in response to scanning, the three states comprising:
a first state in which: in response to the scanning, a narrowband control channel within the 700 MHz narrowband frequency range is found;
a second state in which: in response to the scanning, a narrowband control channel within the 800 MHz narrowband frequency range is found; and
a third state in which: in response to the scanning, a narrowband control channel is unable to be found by the narrowband portable communication device within the 700 MHz narrowband frequency range within a predefined time period, and in response thereto, the narrowband portable communication device instructs the broadband communication device to disable its C-Block broadband transmissions, and the narrowband portable communication device then scans the 700 MHz narrowband frequency range for a control channel with minimized radio frequency (RF) interference from the broadband communication device; and
wherein each of the three states is responded to via the unidirectional communication without intermediate routing.

4. The method of claim 3, wherein in response to a narrowband control channel being found within the 700 MHz narrowband frequency range, the narrowband portable communication device instructs, via the unidirectional communication and without intermediate routing, the broadband communication device to roam from its C-Block broadband transmissions.

5. The method of claim 3, wherein in response to a narrowband control channel being found within the 800 MHz narrowband frequency range, the narrowband portable communication device instructs, via the unidirectional communication and without intermediate routing, the broadband communication device to roam from its cellular A&B broadband transmissions.

6. The method of claim 3, further comprising:
in response to the narrowband portable communication device being unable to find a control channel in the first frequency range within the predefined time, the narrowband portable communication device rescinding the disable instruction to the broadband handheld communication device pertaining to C-Block broadband transmissions and entering a fourth state in which:
the narrowband communication device instructs, via the unidirectional communication and without intermediate routing, the broadband communication device to disable its cellular A&B transmissions while the narrowband device scans over the 800 MHz frequency;
or,
when a control channel is found in the 700 MHz narrowband frequency range, the narrowband communication device instructs the broadband communication device to roam from C-Block broadband transmissions so the narrowband communication device monitors the control channel that was found in the 700 MHz narrowband frequency range.

7. The method of claim 6, further comprising:
assigning the narrowband portable communication device with a call in the 700 MHz narrowband frequency range or the 800 MHz narrowband frequency range, the assigned call being kept clear of interference from the broadband handheld communication device by having the narrowband portable communication device instruct the broadband handheld communication device to disable C-Block broadband transmissions during calls in the 700 MHz narrowband frequency range, and to disable A and B cellular transmission transmissions during calls in the 800 MHz narrowband frequency range.

8. The method of claim 7, further comprising:
rescinding the disable instructions, via the unidirectional communication and without intermediate routing, from the narrowband portable communication device to the broadband handheld communication device once the assigned call has ended.

9. The method of claim 5, wherein the broadband communication device is a handheld communication device.

10. The method of claim 5, wherein the broadband communication device is a vehicular mobile communication device.

11. The apparatus of claim 1, wherein communications from the narrowband portable communication device to the broadband handheld device are direct with no intermediate routing.

12. The method of claim 3, wherein communications from the narrowband communication device to the broadband communication device are direct with no intermediate routing.

13. The portable communication device of claim 1, wherein the narrowband portable communication device further comprises an interference detector to determine when the physical proximity between the narrowband portable communication device and the broadband handheld device poses a potential for RF interference.

14. The method of claim 3, wherein the narrowband portable communication device further comprises an interference detector to determine when the physical proximity between the narrowband communication device and the broadband communication device poses a potential for RF interference.

15. The portable communication device of claim 1, wherein avoiding potential RF interference from the broadband handheld device while the narrowband portable communication device handles the call provides collaborative interference mitigation between physically proximate narrowband and broadband communication devices utilizing spectrally proximate spectrum blocks.

16. The method of claim 3, wherein the three states provide for collaborative interference mitigation between physically proximate narrowband and broadband communication devices utilizing spectrally proximate spectrum blocks.

17. The portable communication device of claim 1, wherein the narrowband communication network is a public safety communication network having higher priority than the broadband communication network.

18. The method of claim 3, wherein the narrowband communication network is a public safety communication network having higher priority than the broadband communication network.

* * * * *